United States Patent [19]

Hansen et al.

[11] Patent Number: 4,899,274

[45] Date of Patent: Feb. 6, 1990

[54] DYNAMIC TERMINAL ADDRESS ALLOCATION BY THE TERMINAL ITSELF IN A DATA PROCESSING SYSTEM

[75] Inventors: Barry W. Hansen, Rochester; Raymond F. Romon, Oronoco, both of Minn.

[73] Assignee: International Business Machines Corporation, Armonk, N.Y.

[21] Appl. No.: 348,143

[22] Filed: May 2, 1989

Related U.S. Application Data

[63] Continuation of Ser. No. 789,798, Nov. 21, 1985, abandoned.

[51] Int. Cl.⁴ .............................................. G06F 7/00
[52] U.S. Cl. .................................... 364/200; 364/229; 364/229.2
[58] Field of Search ... 364/200 MS File, 900 MS File, 364/131, 138; 340/825.05, 825.22, 825.52, 825.5, 825.07; 370/85, 89

[56] References Cited

U.S. PATENT DOCUMENTS

| | | | |
|---|---|---|---|
| 4,025,903 | 5/1977 | Kaufman et al. | 364/200 |
| 4,403,303 | 9/1983 | Howes et al. | 364/900 |
| 4,488,232 | 12/1984 | Swoney et al. | 364/200 |
| 4,511,958 | 4/1985 | Funk | 364/200 |
| 4,551,721 | 11/1985 | Kozlik | 340/825.5 |
| 4,591,973 | 5/1986 | Ferris, III et al. | 364/200 |
| 4,638,313 | 1/1987 | Sherwood, Jr. et al. | 340/825.52 |
| 4,644,468 | 2/1987 | Doster et al. | 364/200 |
| 4,644,470 | 2/1987 | Feigenbaum et al. | 364/200 |

Primary Examiner—Raulfe B. Zache
Assistant Examiner—Jonathan C. Fairbanks
Attorney, Agent, or Firm—J. Michael Anglin

[57] ABSTRACT

A system has a central processor and multiple addressable terminals connected by a communication cable. The terminal itself contains a list of candidate addresses it can use. The terminal determines which of the candidate addresses are already in use by other terminals, and selects one (or more) for itself that is not in use.

12 Claims, 4 Drawing Sheets

DYNAMIC TERMINAL ADDRESS ALLOCATION BY THE TERMINAL ITSELF IN A DATA PROCESSING SYSTEM

This is a continuation of copending application Ser. No. 789,798 filed on Oct. 21, 1985, now abandoned.

BACKGROUND OF THE INVENTION

The present invention relates to electronic data processing, and more specifically concerns the selection of unique addresses by multiple terminals connected to a central processor by a communication cable.

Many data-processing (DP) systems have a central processor connected to multiple physically remote terminals by a communication medium such as a cable. To avoid running a separate cable to each terminal, a single multi-drop cable usually connects to each terminal. Each terminal then listens on the cable for its own unique address, and receives or transmits data only when specifically addressed.

An increasingly acute problem areises in such systems. Communication efficiency requires a relatively small number of possible addresses, since they must be sent on the cable along with the data. Also, existing system architectures and protocols have a limited number of addresses in any case. On the other hand, more powerful terminals—and personal computers emulating such terminals—can support multiple simultaneous tasks, and thus require multiple addresses for a single physical box. In the IBM System/36, for example, one cable supports seven addresses, but an IBM Personal Computer can emulate one or two concurrent terminal display sessions, a printer, and still other functions, several at the same time. This severely limits the number of boxes that can be connected to the cable at once, even though the usage might be quite low. That is, an operator might power up his terminal only occasionally, yet that terminal must reserve three (or more) of the seven addresses for its own use. This situation increases the number of ports, cables, and controllers of the system, and therefore increases its cost.

The prior art has responded to this and related problems. Some terminals have hardware switches which the operator can set to assign a unique address. Such a solution of course requires the operator to ascertain which addresses might be available before he powers up. This is time consuming, and errors would crash the entire system. The central processor could keep a table of addresses available for each port and assign them as terminals are powered up. This would require some action by an operator at the central processor; either the terminal operator would have to go to the location of the processor, or someone else would have to man the processor all the time.

SUMMARY OF THE INVENTION

The present invention allows a terminal to assign its own address(es) at the time it is powered up for actual use. This is done automatically, without requiring any operator action at the time. The possible addresses can be specified in advance, and multiple addresses can be selected for the same terminal. Error conditions can be recovered.

Broadly, the invention achieves these and other goals by causing the terminal itself to designate a candidate address from a predefined table or list in the terminal, to detect whether or not a candidate address is already in use by another terminal on the cable or communication medium, to designate further candidates from the table until a free one is found, and then to select the free address as the terminal address and thereafter to communicate using that address. Additional addresses can be selected in the same way.

These and ootther aspects and advantages of the invention will become apparent to those skilled in the art from the following description of a preferred embodiment.

DESCRIPTION OF A PREFERRED EMBODIMENT

Figure 1:
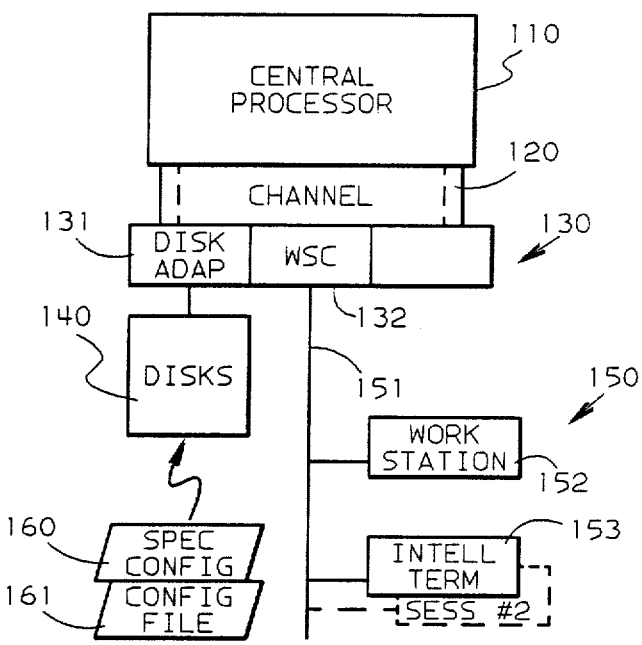
FIG. 1 is an overall block diagram of a data-processing system.

FIG. 1 is a high-level block diagram of a data-processing system 100 in which the present invention can be implemented. In this example, system 100 will be taken to be a publicly available IBM System/36. Central processor contains conventional processing engines and memories. Channel 120 mediates the communication between processor 110 and input/output (I/O) adapters 130. Adapter 131 handles one or more disk drives 140 for secondary storage. Workstation controller (WSC) 132 handles communications with workstation terminals 150, using half-duplex transmission on a multi-drop twinaxial cable 151 as a communications medium. Heretofore, workstations have been dedicated, non-intelligent terminals 152, such as the IBM 5250 and IBM 5290 family. In this example, WSC 132 can handle up to seven addresses; each such terminal 152 occupies one address. Increasingly, however, users desire to connect multi-function intelligent terminals and to employ personal computers (PCs) which emulate the line protocol of a terminal such as 152. Such an intelligent terminal or personal computer (these terms will be used interchangebly) 153 may occupy several addresses: one for each of two concurrent user sessions, one for a printer connected to the PC, and so on. These additional addresses are represented by dashed lines in FIG. 1.

When system 100 is initially set up, it must be configured so that the operating system or control program knows what facilities it has to work with. A conventional configuration program 160 allows a user or installer to specify parameters in a configuration file 161, normally stored on a disk 140. Each record of file 161 includes the following information:

A port number designating which of multiple cables 151 the terminal connects to.

An address number, 0–6, on the specified port.

The model number of the terminal; this specifies its capabilities: for a display, screen size, graphics, etc.; for a printer, speed, character fonts, etc.

Figure 2:
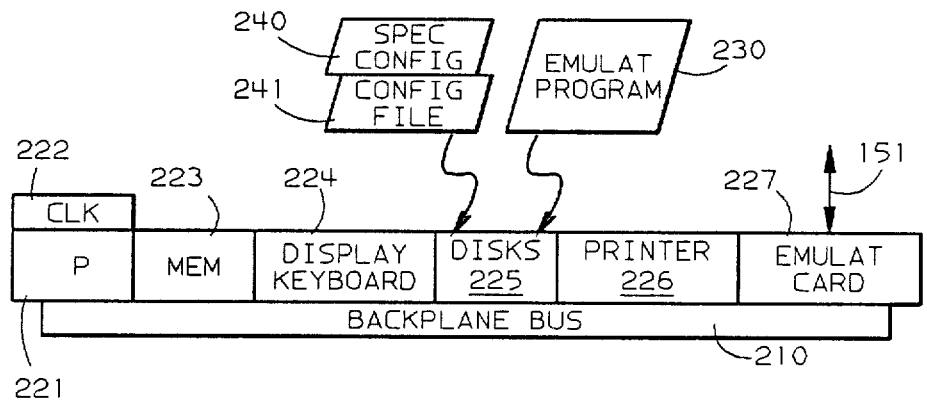
FIG. 2 is a block diagram of a terminal incorporating the invention.

FIG. 2 illustrates a representative terminal in the form of a PC 153. Backplane bus 210 carries address, data, and control signals for interconnecting a number of conventional units 220, such as microprocessor 221 and clock 222, read-only and read/write memory 223, keyboard and display 224, flexible-disk drives 225, printer 226, and others.

The emulator hardware 227 of the invention physically plugs into bus 210 as a card, and also connects to cable 151. It contains enough hardware to emulate two terminals simultaneously; more could be included if desired. Emulation program 230, which allows terminal 153 to emulate the desired protocol, is read from disk into memory 223; it is executed by microprocessor 221 when the user calls for it. When the emulator is installed or the system is modified, the user must run a configuration program 240 to specify certain parameters in a configuration file 241. These parameters allow the user to specify a table of the station addresses to which terminal 153 will respond. This is merely a list of seven numbers, each from 0 to 6, in the desired order. Since the hardware supports two addresses, the operator can specify another table of six numbers in any desired order for the second session. The numbers on the second list should not duplicate those on the first, although this could be accommodated if desired.

Figure 3:
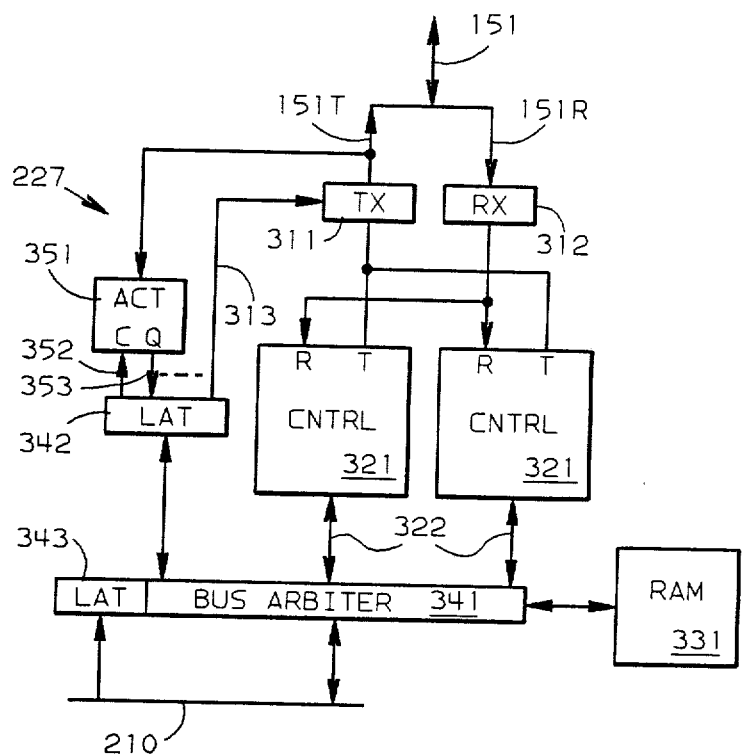
FIG. 3 shows the emulator hardware of FIG. 2 in greater detail.

FIG. 3 shows the relevant hardware of emulator card 227, FIG. 2. The card occupies a set of 8K (K=1,024) memory addresses on bus 210, and adedicated I/O-space address. Using the memory-address space of microprocessor 221 in this way minimizes possible conflicts with other installed devices.

Cable 151 carries a single signal at a time, in half-duplex mode: that is, from WSC 132 to all terminals at once, or from one terminal to the WSC. The individual bits in the 16-bit frames of the conventional IBM 5250 protocol are:
  1 Sync bit for the frame.
  8 Data bits, either a character code or a terminal command.
  3 Station address bits, 0-6 (address 7 is used to end messages).
  1 Parity bit for the entire frame (parity is one example of an internal consistency check of the frame data).
  3 Fill bits.

Transmitter 311 and receiver 312 repower and level-shift the serial signals on these two lines. Line 313 can disable transmitter 311 to prevent signals from passing to cable 151.

Two conventional controller modules 321 handle the line protocol, one for each of the two addresses; they are implemented as finite-state machines. Both modules connect to the receiver and transmitter; software ensures that only one at a time is active. Each controller uses 20 addresses in a 1K range of the memory space of uP 221; one address bit on bus 210 differentiates between the two controllers. Each controller has a station-address register 323 holding the three-bit address to which it will respond, and also has a comparator for detecting equality between the station address in register 323 and the address in a frame received from cable 151. Parallel data and address lines 322 of controllers 321 couple to bus 210 through a conventional bus arbiter 341. Arbiter 341 also couples to a 6K-byte read/-write memory (RAM) 331 such that both uP 221 and controllers 321 can access it without mutual interference. To uP 221, RAM 331 appears as 6K bytes in its memory-address space.

Activity logic 351 listens on transmit cable 151 to detect signals transmitted by any terminal after receiving a Clear signal on line 352. The presence of any signal is indicated on line 353. The time interval between clearing and reading logic 351 is determined by software, and represents a valid response by a terminal to a poll by WSC 132 or a continuous command string sent to another terminal, as described later.

Latches 342 hold bits 313, 352, 353, and others not relevant to the invention. These bits are set and reset merely by writing to certain addresses on bus 210; the actual data bytes written are immaterial.

Control latch 343 determines the position of all the memory-mapped addresses by receiving four high-order address bits as data from bus 210 at a dedicated I/O-space address. Since bus 210 has 20 address lines, these four bits locate the addresses of controllers 321, RAM 331, and latches 342 in a 64K-byte region of the microprocessor's address space. Three more bits have a fixed decode, further limiting the location of arbiter 341 to an 8K section of this region.

Figure 4:
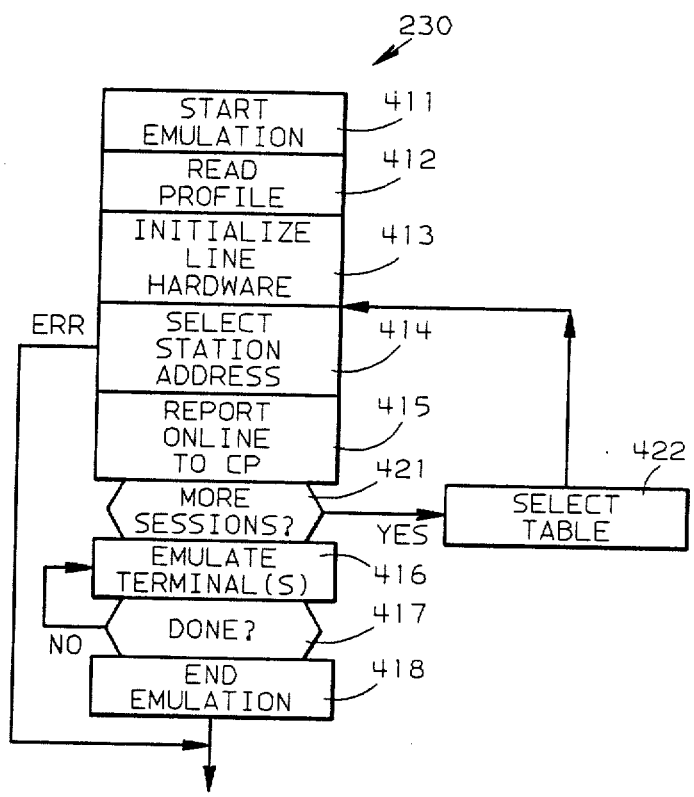
FIG. 4 is a flowchart of the emulator program of FIG. 2.

FIG. 4 is an overview of the entire emulation program 230, FIG. 2. All of the major functions 411–418 are conventional, except for address-selection block 414. Block 411 starts routine 230 when the terminal user requests an emulation task. Block 412 then reads configuration file 241, FIG. 2, and block 413 initializes the emulator card 227 by writing the location of its addresses to control latch 341 as described above.

Block 414 selects the station address from the list on the configuration file. An error exit ERR is taken past blocks 415–418 if the selection process is not successful; see FIG. 5.

Block 415 then reports the terminal on-line with the selected address by writing a power-on bit to the status register of controller 321, FIG. 3. The next poll from WSC 132 over cable 151 will read this status and proceed to send frames to that address. (The address is also placed in memory 331 for use by the emulation program.) Block 416 then manages the emulation session, sending and receiving data frames tagges with the selected address. When the user is finished, he presses a key to end all sessions at that terminal. Block 417 then causes block 418 to close down the emulator card 227 by disabling its addresses in decoder 342 and resetting controllers 321.

Blocks 421–422 handle multiple sessions per terminal. If the operator requests another session (display, printer, etc.), block 421 passes control to block 422. The latter block selects another table in file 241 for the requested session. In the present implementation, configuration program 240, FIG. 1, automatically precludes addresses in one session table from appearing in a another table for the same terminal. Another approach could be to include another step (not shown) after 422 to lock out from the new table any addresses previously selected by block 414.

Figure 5:
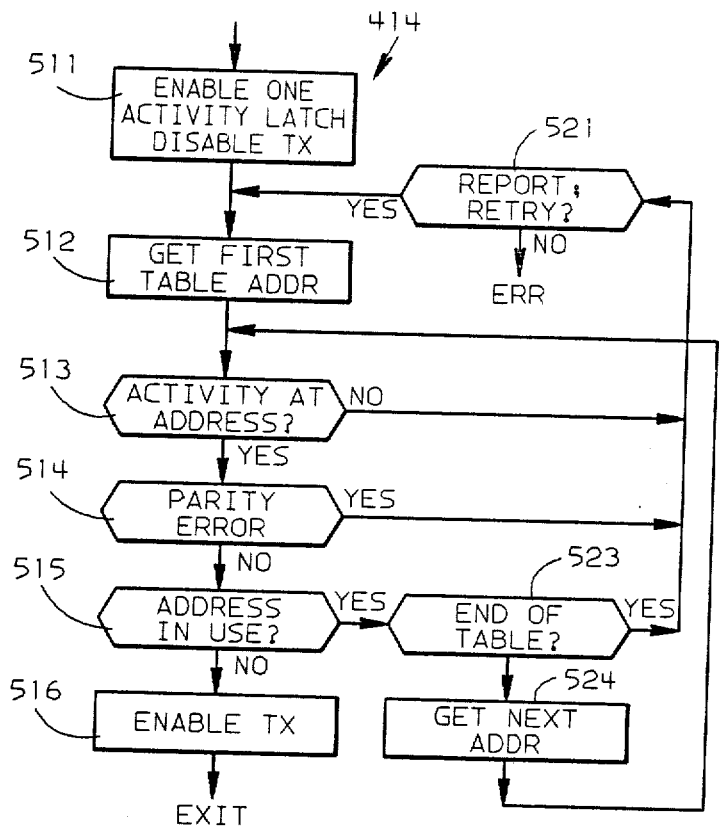
FIG. 5 shows the address-selection function of FIG. 4 in more detail.

FIG. 5 details routine 414, FIG. 4, for selecting the station address dynamically. First, block 511 disables transmitter 323 (via line 313, FIG. 3), so that emulator 227 cannot inadvertently collide with some other terminal's address as the candidate addresses are tested. Block 512 then gets the address table from configuration file 241, and seta a pointer to the first candidate address in it. This address is loaded into the station-address register 323 of the appropriate controller 321. Block 513 listens for activity on cable 151 for a predetermined time interval, set by a software timing loop. Address comparator 324 sends a signal on a line 322 if a frame for the candidate address is received on cable 151. In this example, WSC 132 polls all station addresses in its configuration file 161 at least once every eight seconds; a timeout of ten seconds thus catches at least one complete polling cycle. If block 513 detects some line activity, block 514 next checks for a parity error in the frame by reading a status bit in the controller 321. If parity is correct, block 515 determines whether the candidate station address is in use by another terminal. The communication protocol requires a station to respond to its address between 30 and 60 microseconds (usec) after a poll. This is done by waiting 30 usec, clearing activity logic 351, waiting another 30 usec, then reading its output bit 353. The controller 321 will of course respond, since it contains the candidate address; however, disabling transmitter 311 prevents logic 351 from detecting this attempted response, and prevents interference with another terminal at that address. If the candidate address is not in use, block 516 enables transmitter 311, so that the controller 321 holding the address can thereafter communicate over cable 151 with that address.

If block 515 finds that the candidate address is already in use, block 523 asks whether the current candidate is the last one in the table. If not, block 524 moves a pointer to the next candidate and passes control to block 513 for another try.

Several error conditions may occur during the selection. Block 513 can time out without detecting any cable activity. This could be caused by loss of power at the central processor, a broken cable connection, or the absence of the candidate address from central-processor configuration file 161. If block 514 detects incorrect parity in the received frame, routine 414 cannot be certain what address was in fact sent, so it signals a possible error. Block 523 can find that all the candidate addresses in the table have been tried without success. Other potential problems can also be tested. When an error has been sensed, block 521 reports it to the user, and asks whether he wishes to retry. If so, control passes to block 512 to restart the selection process. If not, an error exit ERR is made from routine 414.

The above description encompasses one implementation on a particular data-processing system. Variations within the scope of the invention will appear to those skilled in the art.

We claim as our invention:

1. In a data-processing system having a central processor and multiple terminals connected thereto by a common communications medium, wherein all of said terminals require mutually different terminal addresses for passing data to and from said processor over said medium, and wherein each of said terminals includes microprocessor, memory, and input/output means all interconnected by a bus, a combination physically located in at least one of said terminals for assigning a terminal address to said one terminal, comprising:
   (a) a terminal controller coupled to said bus and having enabled and disabled states, said controller being coupled to said medium and adapted when in said enabled state to pass signal frames, containing both address bits and data bits representing character codes and commands, between said terminal and said processor using a predetermined one of said terminal addresses as the address of said one terminal;
   (b) means for setting said controller to said disabled state;
   (c) means coupled to said communication medium for detecting which ones of said terminal addresses have been transmitted on said communications medium;
   (d) a table containing a set of candidate terminal addresses selected from said mutually different terminal addresses;
   (e) an emulator for comparing said candidate terminal addresses with said terminal addresses transmitted on said medium, and for assigning as said predetermined one of said terminal addresses, one of said candidate addresses other than said terminal address detected by said detecting means, and thereafter for setting said controller to said enabled state, said emulator being further adapted for processing said data bits;
   (f) arbiter means capable of assigning any of multiple groups of addresses in an address space of said microprocessor for coupling said controller to said bus;
   (g) latch means coupled to said arbiter for specifying one of said multiple groups of addresses.

2. The system of claim 1, further comprising:
   (h) a read/write memory coupled to said arbiter means for transferring data to and from said controller and also to and from said bus within said one group of addresses.

3. The system of claim 1, wherein said address space is a memory address space of said microprocessor.

4. In a data-processing system having a central processor and multiple terminals connected thereto by a common communications medium, wherein all of said terminals require mutually different terminal addresses for passing data to and from said processor over said medium, and wherein each of said terminals includes microprocessor, memory, and input/output means all interconnected by a bus, a combination physically located in at least one of said terminals for assigning a terminal address to said one terminal, comprising:
   (a) a terminal controller coupled to said bus and having enabled and disabled states, said controller being coupled to said medium and adapted when in said enabled state to pass signal frames, containing both address bits and data bits representing character codes and commands, between said terminal and said processor using a predetermined one of said terminal addresses as the address of said one terminal;
   (b) means for setting said controller to said disabled state;
   (c) means coupled to said communication medium for detecting which ones of said terminal addresses have been transmitted on said communications medium;
   (d) a table containing a set of candidate terminal addresses selected from said mutually different terminal addresses;
   (e) an emulator for comparing said candidate terminal addresses with said terminal addresses transmitted on said medium, and for assigning as said predetermined one of said terminal addresses, one of said candidate addresses other than said terminal address detected by said detecting means, and thereafter for setting said controller to said enabled state, said emulator being further adapted for processing said data bits, wherein said means for setting said controller to said disabled state and said means for detecting said terminal addresses are coupled to said bus.

5. In a data-processing system including:
   a communications medium;

a central processor coupled to said said communications medium, and repeatedly transmitting polls thereover, each said poll comprising a sequence of all addresses in a predefined set of permissible addresses; and a plurality of terminals each capable of being coupled to and uncoupled from said communications medium, and each responding, after having been coupled to said communications medium, to a different one of said permissible terminal addresses for sending data to and receiving data from said central processor whenever said one address is detected during each of said polls, a combination located in at least one of said terminals for selecting which one of said permissible addresses said one terminal will respond to for transmitting and receiving said data during each of said polls after said terminal has been coupled to said medium, said combination comprising:

a controller including a station-address register and coupled to said medium for passing a frame of said data between said terminal and said central processor according to a predetermined protocol during any of said repeated polls, whenever the address on said medium matches the contents of said station-address register;

disabling means for preventing said controller from passing said frame of data to said central processor;

a table containing a set of said candidate terminal addresses arbitrarily selectable from said set of permissible terminal addresses;

activity logic responsive over perods of at least one of said polls for determining whether another of said terminals has responded during said one poll to a candidate terminal address;

a terminal processor located in said one terminal for successively selecting different ones of said candidate addresses from said table during each of said periods, until said activity logic indicates that no other terminal has responded to one of said candidate addresses within one of said periods, and for loading said one candidate terminal address into said station-address register and deactivating said disabling means so as to allow said controller thereafter to pass said data to and from said central processor during all subsequent polls using said one candidate address as that one of said permissible addresses to which said one terminal will respond for transmitting and receiving said data during each of said polls after said terminal has been coupled to said medium.

6. In a data-processing system having a central processor coupled to a plurality of terminals by a communications medium, wherein said central processor cyclically polls a set of permissible terminal addresses for passing data frames between said central processor and said terminals according to a predetermined protocol, and wherein each of said terminals responds to a different one of said terminal addresses for passing said data frames to and from said central processor during each of said polls, a method executed within one of said terminals for establishing which one of said permissible terminal addresses will become its own station address to which said one terminal will respond for passing said data frames to and from said central processor during subsequent ones of said polls, said method comprising:

(a) accessing a table of potential station addresses belonging to said set of permissible terminal addresses;

(b) selecting one of said potential station addresses as a candidate station address;

(c) detecting activity on said communications medium for a period of time at least as great as one complete poll of all said permissible terminal addresses;

(d) determining whether another terminal in said system has responded to said poll during said period of time using said candidate station address as said other terminal's own station address for passing data between said other terminal and said central processor;

(e) if so, selecting another of said potential station address from said table as said candidate address and repeating steps (c) through (e);

(f) if not, selecting said candidate address as said station address;

(g) thereafter, during polls subsequent to step (f), responding to said station address as its own address for passing said data frames between said one terminal and said central processor.

7. The system of claim 6, further comprising:

(h) disabling said one terminal from passing said data frames to said central processor until after step (f).

8. The system of claim 6, further comprising:

(i) detecting the presence of an error condition on said communicatons medium during step (c);

(j) suppressing at least step (g) when said error condition is detected.

9. The system of claim 8, wherein said error condition is the absence of a valid poll on said communicatons medium.

10. The system of claim 8, wherein said error condition is an inconsistency in at least one of said data frames.

11. The system of claim 8, further comprising:

(k) retrying said method during a subsequent one of said polls after said one period of time.

12. The system of claim 6, further comprising:

(l) after step (g), accessing a second table of potential station addresses belonging to said set of permissible terminal addresses;

(m) repeating steps (b) through (e);

(n) if in step (d) another terminal or said one terminal using said station address has not responded to during said period of time using said candidate address, selecting said candidate address as a further station address;

(o) thereafter, during polls subsequent to step (n), responding to both said station address and said further station address as the adresses for passing said data frames between said one terminal and said central processor.

* * * * *